United States Patent [19]

Skilliter, Jr.

[11] 4,105,295

[45] Aug. 8, 1978

[54] MIRROR ASSEMBLY WITH FRANGIBLE ANGULAR PROJECTIONS

[75] Inventor: Robert T. Skilliter, Jr., Genoa, Ohio

[73] Assignee: The Acme Specialty Manufacturing Company, Toledo, Ohio

[21] Appl. No.: 808,920

[22] Filed: Jun. 22, 1977

[51] Int. Cl.$^2$ .............................................. G02B 5/10
[52] U.S. Cl. ....................................... 350/303; 52/475
[58] Field of Search ............... 350/303, 304, 310, 288; 248/475 A, 475 B, DIG. 1; 52/475, 573

[56] References Cited

U.S. PATENT DOCUMENTS

| 3,334,959 | 8/1967 | Walsh | 350/310 |
| 3,601,476 | 8/1971 | Mackenzie | 350/310 |
| 3,815,429 | 6/1974 | Goulart | 350/310 |

*Primary Examiner*—Jon W. Henry
*Attorney, Agent, or Firm*—Richard D. Emch

[57] ABSTRACT

A rear view mirror assembly for mounting on the exterior of a vehicle is disclosed. The mirror assembly is subject to extremes of ambient temperature and comprises a housing of a rigid foam plastic with provision for compensating for contraction of the housing.

10 Claims, 8 Drawing Figures

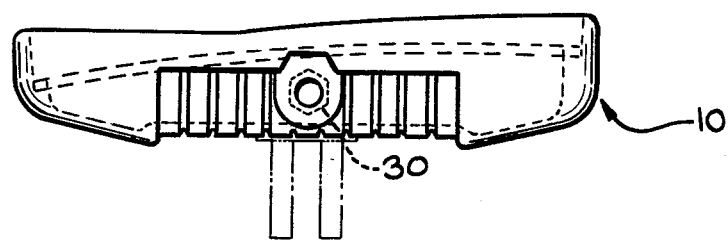
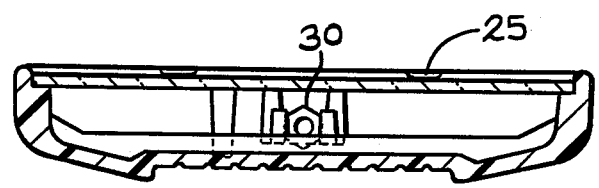
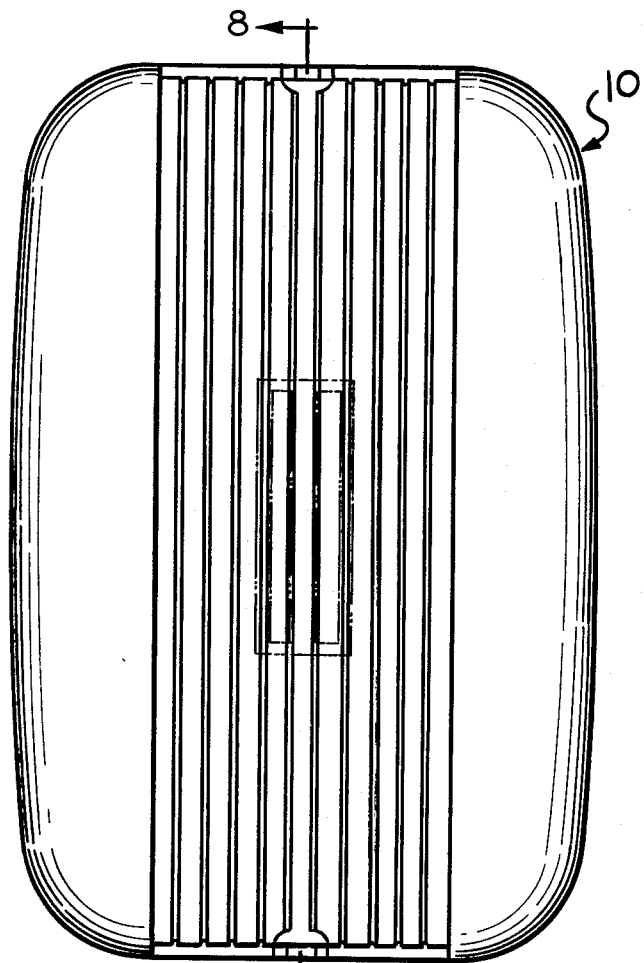
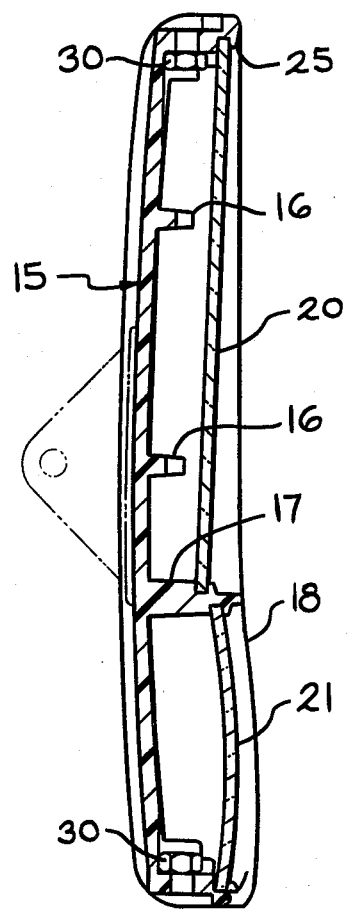

MIRROR ASSEMBLY WITH FRANGIBLE ANGULAR PROJECTIONS

BACKGROUND OF THE INVENTION

It is known that it is advantageous to provide a multifocus rear view mirror for trucks and the like that can be mounted on the side of the vehicle cab and that will give both distance and close vision to the side and rear. Such mirrors have usually been mounted in metal frames although synthetic resin frames have been tried in some instances. The mirrors are exposed to outside temperatures and the mounting must support the glass throughout a temperature range of −40° F. to 140° F. without cracking the glass at the low end of the range or permitting it to become dislodged at the hotter end of the range.

BRIEF DESCRIPTION OF THE INVENTION

The invention is directed to a mirror mounting system in which the glass elements are retained in a frame formed of a synthetic resin. The mirror assembly comprises a housing having a peripheral rim and inwardly directed shoulder. Extending between the rim and the shoulder are several frangible angular projections against which several glass mirrors are retained by small tabs.

As the retaining frame contracts upon exposure to low outside temperatures, forces are set up which either tend to crack the glass or the frame. The frangible elements utilized in the present invention safely relieve these forces. If extreme frame contraction takes place, the elements will fail in a predictable manner and will protect both the glass and the frame against injury.

BRIEF DESCRIPTION OF THE DRAWINGS

FIG. 5 is a top plan view thereof;

FIG. 6 is a section thereof on line 6—6 of FIG. 2;

FIG. 7 is a rear elevational view thereof; and

FIG. 8 is a section thereof on line 8—8 of FIG. 7.

DETAILED DESCRIPTION OF A PREFERRED EMBODIMENT

Figure 1:
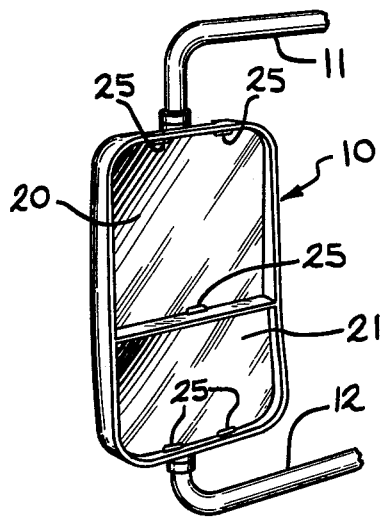
FIG. 1 is a perspective view of a complete mirror assembly embodying the present invention.

A complete mirror assembly is designated 10 and in the form shown in FIG. 1 is mounted on the outside of a vehicle by upper and lower mounting arms 11 and 12. The angle made by the mirror with respect to the front and back axis of the vehicle is adjustable in a known manner. The mirror assembly 10 comprises an upper flat mirror section 20 which gives the driver unit magnification and a close-in view of objects to the side and rear, and a convex lower mirror section 21 which imparts a longer and wider range view of the desired area. The mirrors are arranged so that the driver can use each of them to advantage either individually or sequentially.

Two mirror lenses 20 and 21 are mounted in a single hollow compartmented housing 15 having relatively massive side and end walls and intermediate stiffening ribs 16. A crossbar 17 separates the upper and lower mirror compartments. Each of the side and end walls and the crossbar 17 has an upstanding peripheral rim or flange 18 and a shoulder 19. The mirror lenses 20 and 21 fit over the shoulders 19 and are spaced from the surrounding rim 18 of the frame 10 by about 1/32 inch at normal room temperature.

The housing 15 is constructed of a plastic material. While polypropylene is preferred, many other types of plastics may be utilized. For example, ABS (Acrylonitrile-Butadiene-Styrene), high molecular weight polyethylenes, and certain polystyrenes may also be utilized. It is preferred that the coefficient of thermal expansion generally fall in the range of 2.5 to 13 × $10^{-5}$ inch/inch/° C, the glass fiber reinforced plastics normally falling at the lower end of the range. The preferred polypropylenes generally fall in the range of between 2.9 – 10.2 × $10^{-5}$ inch/inch/° C, with respect to their thermal expansion properties.

The mirror lenses 20 and 21 are supported above the adjacent shoulders and are spaced therefrom by frangible projections 23, preferably at least two in number on each side of the mirror lenses 20 and 21. The projections 23 are small triangular web-like elements extending between the shoulders 19 and the respective frame rims 18. Laterally, the web-like elements are made only about 1/32 inch thick and the compressive force necessary to crush them can be readily calculated. In preferred embodiments, the projections would be crushed at temperatures between −20° F and −40° F. Prior to failure, however, the web-like elements 23 have a tendency to cam the lenses 20 and 21 upwardly away from the initial position upon contraction of the housing 15.

The mirror lenses 20 and 21 are fixed in the housing 15 by inwardly projecting tabs 25 at the top and bottom. The tabs 25 may be molded integrally with the frame rim from which they extend. The tabs 25 are preferably three in number, one on one side of a lens and two on the opposite side to give a three-point or tripod support for the mirror lenses 20 and 21. The plastic material softens when heated, and at a temperature of about 185° F. to 200° F. the tabs 25 are sufficiently flexible and the housing 15 sufficiently expanded that the lenses 20 and 21 can be slipped beneath the tabs 25. When cooled, the tabs 25 offer a firm holding means against the lens falling out of the housing even if the lens should break. If the lens should become cracked or broken it can be easily replaced by immersing the entire assembly in hot water to expand the housing 15 and soften the tabs 25, removing the broken lens and inserting a new one.

Figure 4:
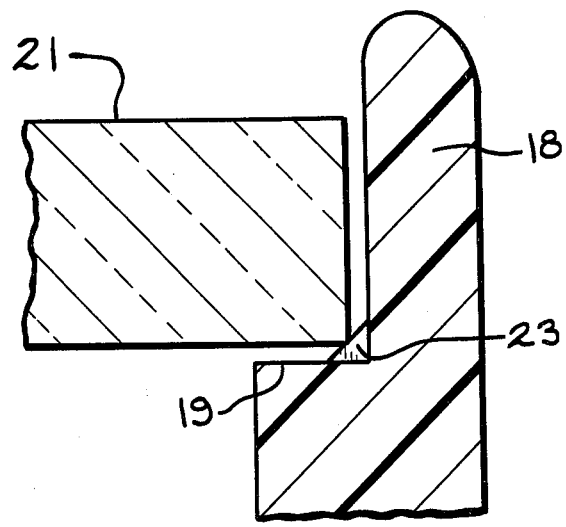
FIG. 4 is an enlarged fragmentary sectional view on line 4—4 of FIG. 2.

The cooperation between the tabs 25 acting against the outer surface of the lenses 20 and 21 and the projections 23 acting against the inner edge thereof is an important aspect of the invention. When the housing 15 is at its softening temperature and thus expanded, the lenses 20 and 21 will seat against or very close to the respective shoulder 19. As the housing 15 contracts upon cooling, the lens 20 or 21 rides up the inclined surface of the projections 23 and it is thus cammed against the tabs 25 to make a tight three-point mounting for the lens with respect to the housing 15. The position of the lens when at about room temperature is shown in FIG. 4, which indicates that the corner of the lens is about halfway up the inclined surface of the projection 23.

Figure 3:
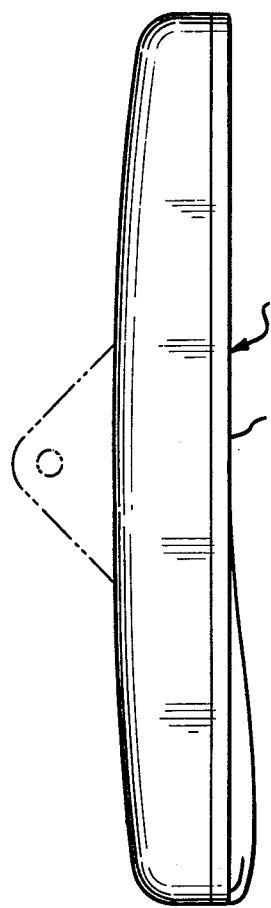
FIG. 3 is a side elevational view thereof.
Figure 2:
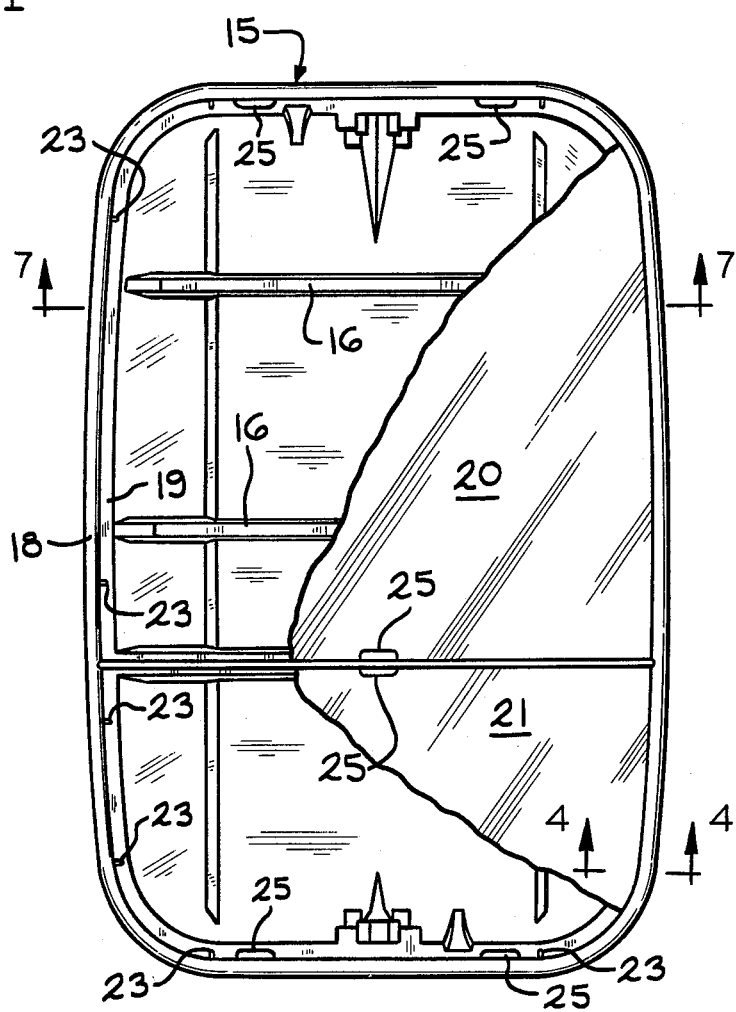
FIG. 2 is a front elevational view thereof with the glass broken away.

The mirror assembly 10 can be mounted on the vehicle in any suitable manner. In FIGS. 3, 5 and 7, a mounting means comprising projecting ears on the back surface of the compartmented housing is shown in dotted lines. In FIGS. 5, 6 and 8, a mounting comprising upper and lower captive nuts 30 is provided to cooperate with a threaded connector carried by arms 11 and 12. The captive nuts 30 may be inserted into a mold prior to introducing the resin material which, when cooled, shrinks around the nuts to hold them firmly in position.

What I claim is:

1. A mirror assembly comprising a housing having a peripheral rim, a shoulder extending inwardly of the housing from said rim below the top thereof, a plurality of thin angular projections disposed in the angle between said rim and said shoulder and formed integrally with both, a plurality of inwardly extending mirror lens engaging tabs formed integrally with said housing rim, and a mirror lens mounted within said housing rim and normally engaged between said angular projections and said tab, said angular projections being frangible upon contraction of said housing relative to said mirror lens by reason of exposure to a predetermined cold ambient temperature.

2. A mirror assembly in accordance with claim 1 in which said angular projections are frangible upon contraction of said housing relative to said mirror lens by reason of exposure to an ambient temperature between $-20°$ F. and $-40°$ F.

3. A mirror assembly in accordance with claim 1 in which said housing is molded from a synthetic resinous material having a higher coefficient of thermal expansion than the mirror lens.

4. A mirror assembly in accordance with claim 1 in which said housing is molded from a plastic material having a coefficient of thermal expansion in the range of 2.5 to $13 \times 10^{-5}$ inch/inch/° C.

5. A mirror assembly in accordance with claim 1 in which said housing is molded from a polypropylene.

6. A mirror assembly in accordance with claim 1 in which said angular projections define cam surfaces for camming the mirror lens against said mirror lens engaging tabs.

7. A mirror assembly in accordance with claim 1 in which three mirror lens engaging tabs are used with at least one tab being positioned on each side of said mirror lens to define a three-point mirror lens mounting.

8. A mirror assembly in accordance with claim 1 in which there are at least two angular projections on each side of said mirror lens.

9. A mirror assembly in accordance with claim 1, including a unit magnification mirror lens and a wide angle mirror lens mounted in said housing.

10. A mirror assembly comprising a housing molded from polypropylene having a coefficient of thermal expansion in the range of 2.9 to $10.2 \times 10^{-5}$ inch/inch/° C., said housing having a peripheral rim, a shoulder extending inwardly of the housing from said rim below the top thereof, at least two thin angular projections disposed in the angle between said rim and said shoulder and formed integrally with both on each of four sides of said housing, a tripod support for a mirror consisting of two inwardly extending tabs on one side of said housing and a single inwardly extending tab on the opposite side thereof, each of said tabs being formed integrally with said housing rim, a mirror lens mounted within said housing rim and normally engaged between said angular projections and said tabs and being cammed against said tabs by said thin angular projections, said projections being frangible upon contraction of said housing relative to said mirror by reason of exposure to an ambient temperature between $-20°$ and $-40°$ F.

* * * * *